Patented June 5, 1923.

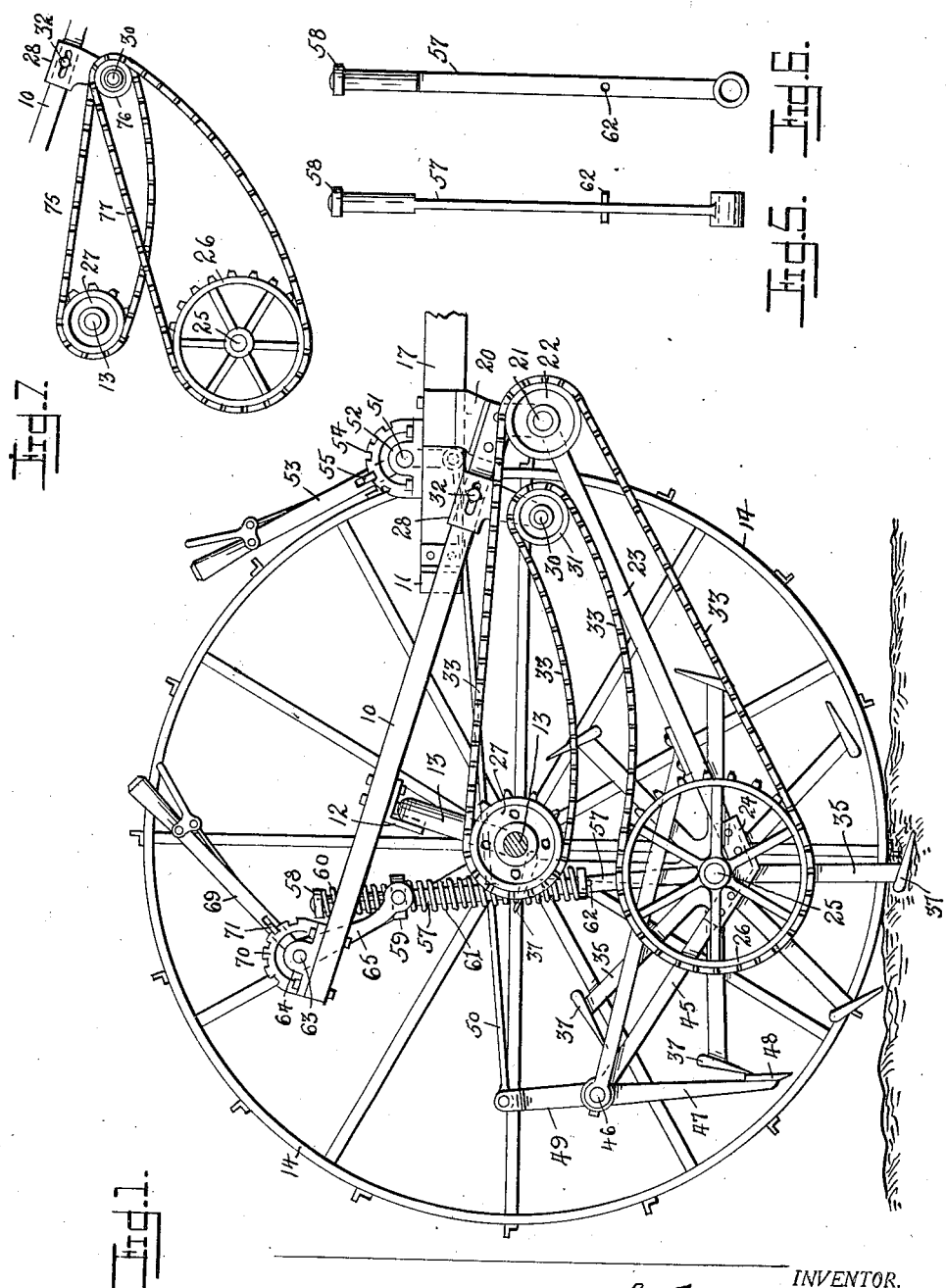

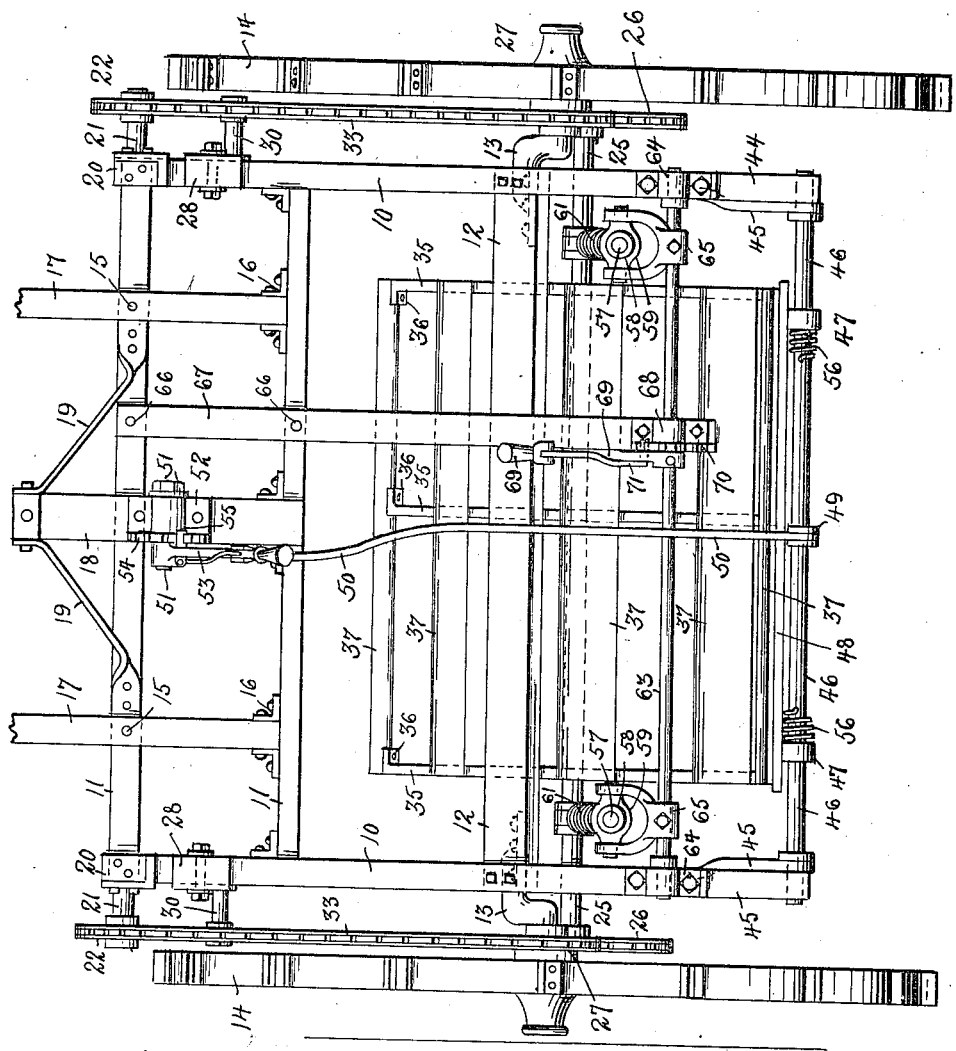

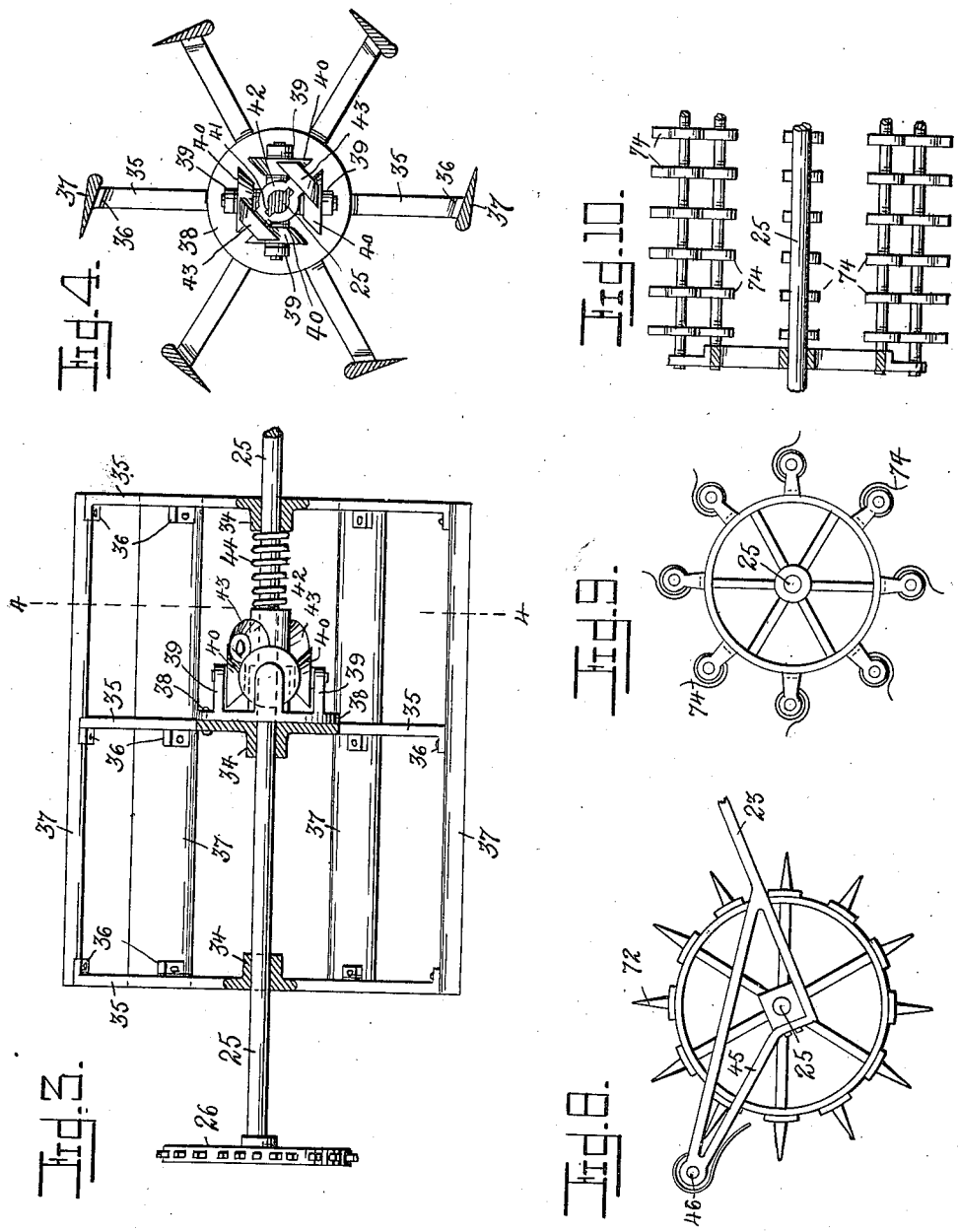

1,457,823

UNITED STATES PATENT OFFICE.

IMMANUEL DAMMEL AND THOS G. DAMMEL, OF GERALDINE, MONTANA.

WHEELED WEEDER.

Application filed March 13, 1922. Serial No. 543,468.

*To all whom it may concern:*

Be it known that we, IMMANUEL DAMMEL and THOS G. DAMMEL, citizens of the United States, residing at Geraldine, in the county of Chouteau and State of Montana, have invented certain new and useful Improvements in Wheeled Weeders, of which the following is a specification.

This invention relates to weeders of the class adapted to be drawn over the ground, and has for one of its objects to improve the construction and increase the efficiency and utility of devices of this character.

Another object of the invention is to provide a device of this character, including a supporting frame, traction wheels, weed severing devices, and means whereby the weed severing devices are caused to rotate at a slower speed than the traction wheels.

Another object of the invention is to provide a device of this character including a rotating structure carrying weed severing elements, and means whereby the severing elements are cleared of the gathered weeds and thereby prevented from clogging the operation.

Another object of the invention is to provide a device of this character having means whereby the severing elements may be adjusted by the driver from his seat to control the depth of cutter to elevate them entirely above the ground when not in use.

With these and other objects in view the invention consists in certain novel features of construction as hereinafter shown and described and then specifically pointed out in the claims, and in the drawings illustrative of the preferred embodiment of the invention:—

Figure 1 is a side elevation of the improved device with the nigh traction wheel removed and the axle in transverse section.

Fig. 2 is a plan view.

Fig. 3 is a sectional detail of one of the automatically releasing driving device for the severing drums.

Fig. 4 is a section on the line 4—4 of Fig. 3.

Figs. 5 and 6 are detached views of the spring controlled adjusting rod.

Fig. 7 is a detail illustrating a modification of the arrangement of the chains controlling the retarding mechanism.

Fig. 8 is a detail view illustrating a modification of the construction of one of the weed severing devices.

Fig. 9 is an end elevation of another modified construction of one of the weed severing devices.

Fig. 10 is a section on the line 10 of Fig. 9.

The improved apparatus includes in general a supporting frame carrying an upwardly arching axle having journals for spaced traction wheels and adapted to be supplied with suitable draft appliances.

The supporting frame comprises end rails or members 10 and a plurality of transverse rail or strut members 11, members 10 being inclined upwardly and rearwardly from the forward transverse member 11, as shown.

The axle member is formed in three portions, a main intermediate portion 12, preferably of an inverted L bar, and down turned stub axles 13 at the ends, and including journals for the traction wheels 14.

The members 13 are flattened at their inner ends and riveted or otherwise secured thereby to the L bar portion 12, as shown.

Attached at 15 and 16 to the transverse frame members 11 are draft tongues 17 to receive the draft appliances, not shown, which may be of any of the usual constructions, or means may be provided for attaching a traction device, but as the means for drawing the apparatus over the ground forms no part of the present invention it is not necessary to illustrate the same.

Likewise rigidly attached to the frame members 11 and centrally thereof, is a supporting member 18 suitably braced as at 19 from the adjacent frame member 11.

Attached to the frame members 10 at their forward ends are brackets or hangers 20, each carrying a stub shaft 21 upon the outer ends of which chain wheels 22 are mounted.

Swinging upon the stub shafts 21 are rearwardly and downwardly inclined beam members 23, and attached at their rear ends to bearing members 24, the latter being preferably substantially square with a central bearing to receive a shaft 25.

The shaft 25 extends at the ends beyond the members 23 and is provided with chain pulleys 26.

Attached to each of the traction wheels 14 and rotative therewith is a chain wheel 27.

Mounted on each of the frame members 10 is a bracket 28, and journaled in each bracket is a stub shaft 30 carrying an idler chain pulley 31.

The brackets 28 are longitudinally slotted to receive clamp bolts 32 passing through the members 10 whereby the brackets are adjustable longitudinally of the frame members.

The various chain wheels 22, 26, 27 and 31 are alined at each side of the machine, and an endless chain 33 extends around each alined series of the chain wheels, and by arranging the idler wheels 31 for longitudinal adjustment, the tension of the chains can be easily controlled, as will be obvious.

Mounted on the shaft 25 are a plurality of spider devices each including a hub 34 and radiating arms 35, each arm having a terminal offset 36 to support a weed severing blade 37. Any required number of the spiders and their attached blades may be employed but for the purpose of illustration three are shown, one at each end and one intermediate the ends of the blades. The combined spiders and blades constitutes an open drum like structure as shown. The chain wheels 27 of the traction wheels 14 are about one half the diameter of the wheels 26 of the shaft 25, consequently the "drum" of the weed severing blades will be caused to rotate at a slow speed and in the same direction as the traction wheels. The weed severing blades are thus retarded in their action and will "drag" over the ground.

As the blades 37 dig into the ground the "drum" has a tendency to rotate and thus impart motion to the chain 33, but the latter being coupled to the traction wheels 14, this motion is checked and held back and the blades caused to drag through the soil.

With the traction wheels about forty-eight inches in diameter, the chain wheel 27 about 6 inches in diameter and the chain wheel 26, twelve inches in diameter, each of the blades 37 will travel about three feet in the soil at a depth of about two inches, at each complete revolution of the traction wheels.

The hub of the intermediate spider is preferably enlarged, and attached to the enlarged portion is a plate 38 having a plurality of spaced legs 39 to pivotally support conical friction rollers 40.

The rollers 40 are arranged in pairs, and two pairs are shown for illustration.

Slidable on the shaft 25 and rotative therewith as by feather and keys represented at 41, is a sleeve 42 having lateral projections on which a pair of bevel or cone faced rollers 43 are mounted to rotate, the rollers 43 being beveled reversely to the rollers 40 as illustrated in Figs. 3 and 4.

A spring 44 is applied to the shaft 25 and holds the rollers 43 in frictional engagement with the rollers 40.

The spring 44 is of sufficient strength to hold the friction clutch members 43 against the clutch members 40 with a sufficient "grip" to rotate the drum and its attached blade so long as the resistance against the blade is normal, but if the blade meets abnormal resistance such as caused by roots, stones, or the like, which would be liable to fracture the blade, the springs will yield and permit the drum to be freed of its rotary movement and roll over any abnormal obstruction without checking the rotation of the shaft 25. By this means all danger of breakage of the blade from any abnormal strain is obviated. When the abnormal strain is relieved, the spring 44 again automatically couples the shaft 25 to the "drum."

Attached at its lower end to each of the brackets 24 is a rearwardly and upwardly inclined standard 45, and journaled through the upper rear ends of the standard is a rock shaft 46. Connected to rock with the shaft near each end and at the center are bars 47. At their lower ends the bars 47 support a clearing blade 48.

Attached to the shaft 46 near its center, is an upwardly directed arm 49 having a pull rod 50 coupled thereto and extending toward the front of the apparatus.

Pivoted intermediate its ends at 51 to a bracket 52 on the support 18 is an operating lever 53, the latter coupled to the forward end of the pull rod 50. A notched segment 54 is attached to the bracket 52 or integral therewith, and the lever 53 is provided with a pawl device indicated at 55, and engaging with the notches of the segment, to hold the severing blades in adjusted position. By this means the shaft 51 may be rocked by manipulating the lever 53 and held in adjusted position, and thus control the position of the blade 48 relative to the paths of the blades 37 as hereafter explained.

Coiled around the shaft 46 adjacent each of the members 47 is a spring 56, each attached at one end to the shaft and at the other end to the adjacent arm 47 and exerting their force to hold the arms and their attached blades 48 yieldably in one position.

An effectual clearer device is thus produced whereby the clogging of the cutting blades 37 is prevented, as hereinafter explained.

Swingingly coupled to the shaft 25 near each end, is a lifting rod 57, the latter extending upwardly and each having a stop head 58 at the upper end. The rods 57 are flat or oblong transversely for the major portion of their lengths and round for the shorter portion of their lengths, whereby a stop shoulder is formed on each of the rods at the juncture of the flat and round portions.

Slidably engaging the flattened portion of each rod is a collar 59, adapted to engage the shoulder on the rod when in one position and thereby limited in its movement in one direction.

Surrounding each of the rods 57 between the head 58 and collar 59 is a spring 60, and surrounding each rod below the collar 59 is a spring 61 the latter limited in its downward movement by a stop pin 62.

A rock shaft 63 is supported for oscillation by bearings 64 upon the members 10 near their rear higher ends, and mounted for rotation with the shaft near the ends are lever arms 65, each lever arm being forked at the lower end and pivotally engaged by each forked portion with one of the collars 59.

Attached to two of the frame members 11 is a supporting member 67 in alinement with the machine transversely and with the members 10.

Mounted on the supporting member 67 is a bearing 68 in which the shaft 63 is rotative.

Mounted on the shaft 63 adjacent to the bearing 68 is an operating lever 69, and carried by the member 67, or integral therewith, is a notched segment 70 with which a pawl carried by the lever 69 and represented at 71 engages to hold the lever in adjusted position.

The members 57 swing freely upon the shaft 25 so that when the lever member 67 is actuated an upward or downward pull will be exerted upon the shaft 25 and its attachments and causes them to swing on the stub shafts 21 as centers, and thus control the position of the drums and the cutting blades carried thereby. The springs 61 enable the drums to rise in event of abnormal resistance to the movements and absorbs the jars and concussions or shocks imparted to the cutting portion of the apparatus.

The clearer blade 48 prevents the severed weeds from clogging the cutting blades, and in event of an abnormal accumulation on one or more of the cutting blades the springs 56 will permit the clearer blades to yield and prevent breakage of any of the parts.

Then in event of the accumulation of roots, heavy branches, or clods caught by the severing blades, the driver can quickly release the members 47 and 48 by actuating the lever 53, as before described.

In Fig. 8 a modified construction of the "drum" is shown consisting in substituting a plurality of spaced spikes 72 for the blades 37 and substituting a plurality of spring fingers 73 for the arms 47 and the clearer blades 48. In the modified structure the spikes 72 tear up the ground and pick out all the weeds and other growths, and in event of the clogging of the spikes, the spring fingers 73 will free the spikes therefrom, as will be obvious.

In Figs. 9 and 10 another modification of the construction of the "drums" is shown consisting in substituting spring fingers 74 for the cutting blades 37, which may be advantageously employed for some kinds of weeds or other growths.

In Fig. 7 is shown a modification of the manner of arranging the driving chains for the drums, consisting in employing an endless chain 75 directly between the chain wheels 27 on the main traction wheels and attaching an extra chain wheel 76 to each of the stub shafts 30, and connecting the same with the chain wheels 26 of the drums by endless chains 77, but the operation would be substantially the same, as the same results are produced, as by the construction shown in Figs. 1 and 2.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention what is claimed as new is:—

1. An apparatus of the class described comprising a supporting frame carrying traction wheels, radius bars swinging from said supporting frame, a drum device having weed severing elements and mounted upon said radius bars and rotative by contact with the ground, rods connected relative to said drum, collars slidably engaging said rods, springs attached to said rods and bearing against opposite sides of said collar, and operative means carried by said frame and attached to said collar.

2. An apparatus of the class described comprising a supporting frame carrying traction wheels, radius bars swinging from said supporting frame, a drum having weed severing elements mounted on said radius bars and rotative by contact with the ground, means carried by said supporting frame for adjusting said radius bars and the drum carried thereby to control the depths of operation of the said weed severing elements, bracket devices extending from said radius bars, a rock shaft mounted on said bracket devices, arms carried by said rock shaft and supporting clearer elements, and means for yieldably supporting said clearer element carrying arms.

3. An apparatus of the class described comprising a supporting frame carrying traction wheels, radius bars swinging from said supporting frame, a drum having weed severing elements mounted on said radius bars and rotative by contact with the ground, means carried by said supporting frame for adjusting said radius bars and the drum carried thereby to control the depths of operation of said weed severing elements, a rock shaft mounted for rotation relative to said radius bars, arms carried by said rock shaft and supporting a clearer element, means for yieldably supporting said clearer element carrying arms, and an operating lever connected to said rock shaft.

In testimony whereof, we affix our signatures hereto.

IMMANUEL DAMMEL.
THOS G. DAMMEL.